US012470232B1

(12) United States Patent
Pang et al.

(10) Patent No.: US 12,470,232 B1
(45) Date of Patent: Nov. 11, 2025

(54) POLAR CODES FOR ERROR CORRECTION IN NON-VOLATILE MEMORY DEVICES

(71) Applicant: Marvell Asia Pte Ltd, Singapore (SG)

(72) Inventors: Chin-Jen Pang, Santa Clara, CA (US); Nedeljko Varnica, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 69 days.

(21) Appl. No.: 18/243,599

(22) Filed: Sep. 7, 2023

Related U.S. Application Data

(60) Provisional application No. 63/404,206, filed on Sep. 7, 2022.

(51) Int. Cl.
*H03M 13/11* (2006.01)
*H03M 13/00* (2006.01)
*H03M 13/13* (2006.01)

(52) U.S. Cl.
CPC ..... *H03M 13/1125* (2013.01); *H03M 13/134* (2013.01); *H03M 13/6566* (2013.01)

(58) Field of Classification Search
CPC ........... H03M 13/1125; H03M 13/134; H03M 13/6566
See application file for complete search history.

(56) References Cited

U.S. PATENT DOCUMENTS

| 10,490,288 B1 * | 11/2019 | Wang | G11C 16/0483 |
| 10,797,728 B1 * | 10/2020 | Varnica | H03M 13/3707 |
| 2013/0283128 A1 * | 10/2013 | Lee | G11C 29/56004 |
| | | | 711/102 |
| 2015/0256196 A1 * | 9/2015 | Alhussien | G06F 11/1076 |
| | | | 714/807 |
| 2020/0235851 A1 * | 7/2020 | Mondelli | H04L 1/1819 |

OTHER PUBLICATIONS

Arikan, "Channel polarization: A method for constructing capacity-achieving codes for symmetric binary-input memoryless channels," Senior Member, IEEE, arXiv:0807.3917v5 [cs.IT] Jul. 20, 2009 (23 pages).
Cover, et al., "Entropy, Relative Entropy, and Mutual Information," Elements of Information Theory, Second Edition, A John Wiley & Sons, Inc., 2006, pp. 13-55 (43 pages).

* cited by examiner

*Primary Examiner* — Mark D Featherstone
*Assistant Examiner* — Jack Kensington Barnett

(57) ABSTRACT

A solid state drive (SSD) device includes a memory having a plurality of memory cells and an encoder configured to encode information using a polar code to generate encoded information to be stored in the memory. The polar code is constructed based on a plurality of channel models corresponding to different read channel scenarios, including at least a first channel model corresponding a first read channel scenario and a second channel model corresponding to a second read channel scenario, the second read channel scenario different from the first read channel scenario. The SSD device also includes a controller configured to write the encoded information to memory cells in the memory, and read the encoded information from the memory cells in the memory using a selected one of the first read channel scenario and the second read channel scenario.

20 Claims, 12 Drawing Sheets

POLAR CODES FOR ERROR CORRECTION IN NON-VOLATILE MEMORY DEVICES

CROSS REFERENCES TO RELATED APPLICATIONS

This application claims the benefit of U.S. Provisional Patent App. No. 63/404,206, entitled "Polar Codes Design and Polar Code Decoding for Error Correction in Soid State Drive (SSD) NAND Flash Channels," filed on Sep. 7, 2022, the disclosure of which is hereby expressly incorporated herein by reference in its entirety.

FIELD OF TECHNOLOGY

The present disclosure relates generally to non-volatile memory devices, and more particularly to polar error correction codes for non-volatile memory devices.

BACKGROUND

Information stored in a memory, such as a NAND flash memory, of a solid state drive (SSD) device is stored as charge or lack of charge trapped in memory cells of the memory of the SSD device. The information is read from the memory of the SSD device by applying one or more reference voltages to the memory cells to determine whether charge is trapped in the memory cell. For example, in a 1-read channel scenario, a single reading of a memory cell is performed by applying a single reference voltage to the memory cell and a hard decision is made based on whether or not the single reference voltage turns on the memory cell. As another example, in a 3-read channel scenario, three readings are performed on a memory cell by applying three different reference voltages to the memory cell, and a soft decision is made based on a combination of three readings obtained from the memory cell.

Generally, information stored in a memory cell of an SSD device is subject to various degradations and variations that, in some cases, lead to errors encountered when the information is read from the memory of the SSD device. Thus, error correction techniques are used in many SSD devices to improve memory storage reliability and performance. For example, some SSD devices use polar codes to encode the information prior to the information being stored in the memory, allowing errors to be corrected when the information is read from the memory. Polar codes, however, are generally constructed for a particular channel and do not exhibit good performance over multiple channel scenarios, such as different read channel scenarios used for reading information from the memory of the SSD device. Moreover, decoding techniques used for decoding information that was encoded using a polar code are sometimes not sufficiently powerful to successfully decode information across various noise characteristics experienced in operation of an SSD device. Thus, an SSD memory device may be configured to implement a more powerful decoding technique that works well across the various noise characteristics experienced in the SSD device. However, more powerful decoding techniques generally increase latency and decrease throughput of the SSD device.

SUMMARY

In an embodiment, a solid state drive (SSD) device comprises: a memory comprising a plurality of memory cells; an encoder configured to encode information using a polar code to generate encoded information to be stored in the memory, wherein the polar code is constructed based on a plurality of channel models corresponding to different read channel scenarios, including at least a first channel model corresponding a first read channel scenario and a second channel model corresponding to a second read channel scenario, the second read channel scenario different from the first read channel scenario; and a controller configured to: write the encoded information to memory cells in the memory, and read the encoded information from the memory cells in the memory using a selected one of the first read channel scenario and the second read channel scenario.

In another embodiment, a method for encoding information for storage in a solid state device (SSD) includes: receiving, at an encoder of the SSD device, the information to be stored in a plurality of memory cells of a memory of the SSD device; encoding, by the encoder, the information using a polar code to generate encoded information to be stored in the plurality of memory cells of the SSD device, wherein the polar code is constructed based on a plurality of channel models corresponding to different read channel scenarios, including at least a first channel model corresponding a first read channel scenario and a second channel model corresponding to a second read channel scenario, the second read channel scenario different from the first read channel scenario; writing, by a controller of the SSD device, the encoded information to memory cells in the memory; and reading, by the controller of the SSD device, the encoded information from the memory using a selected one of the first read channel scenario and the second read channel scenario.

In yet another embodiment, a solid state drive (SSD) device comprises: a memory comprising a plurality of memory cells; an encoder configured to encode information using a polar code to generate encoded information to be stored in the memory; a controller configured to write the encoded information into the memory, and read the encoded information from the memory; and a multi-stage decoder configured to: decode the encoded information, read from the memory, using a first decoding technique, determine whether the information was successfully decoded using the first decoding technique, and in response to determining that the information was not successfully decoded using the first decoding technique, decode the information using a second decoding technique different from the first decoding technique.

In still another embodiment, a method for decoding information retrieved from a memory of a solid state drive (SSD) device includes: decoding, by a multi-stage decoder of the SSD device using a first decoding technique, encoded information read from a memory of the SSD device, wherein the encoded information is encoded using a polar code; determining, by the multi-stage decoder, whether the information was successfully decoded using the first decoding technique; and in response to determining that the information was not successfully decoded using the first decoding technique, decoding, by the multi-stage decoder, the information using a second decoding technique different from the first decoding technique.

DETAILED DESCRIPTION

In embodiments described below, a solid state drive (SSD) device includes an encoder configured to encode information to be stored in a memory of the SSD device using a polar code that is constructed based on a plurality of channel models corresponding to different read channel scenarios supported by the SSD drive device. For example, the SSD device supports a 1-read channel scenario in which a single threshold voltage is used to read information from the memory and one or more multiple-read channel scenarios (e.g., 3-read channel scenario, 5-read channel scenario, etc.) in which multiple reference voltages are used to read data from the memory, in an embodiment. In this embodiment, the polar code used by the encoder to encode information, to be stored in the memory, is constructed based on a channel model that corresponds to the 1-read channel scenario and one or more channel models that correspond to the one or more multiple-read channel scenarios. In various embodiments, because the polar code is constructed based on the plurality of channel models corresponding to different ones of multiple read channel scenarios, the polar code provides good performance over the multiple read channel scenarios. The polar code thus allows the SSD device to read and decode the encoded information with good error correction performance across the multiple read channel scenarios.

Further, in embodiments described below, an SSD device includes a multi-stage decoder configured to decode information read from a memory of the SSD device. In an embodiment, the multi-stage decoder is configured to successively use progressively higher latency but more powerful decoding techniques when the multi-stage decoder fails to successfully decode the information read from the memory. For example, the multi-stage decoder is configured to decode encoded information, read from the memory, using a first decoding technique, and determine whether the information was successfully decoded using the first decoding technique. In response to determining that the information was not successfully decoded using the first decoding technique, the decoder decodes the information using a second decoding technique that is higher in latency but more powerful than the first decoding technique. If the information was not successfully decoded using the second decoding technique, the decoder decodes the information using one or more further decoding techniques with progressively higher latencies until the information is successfully decoded, in an embodiment. Because a more powerful higher latency decoding technique is employed only if information is not successfully decoded using a lower latency technique, average latency of the multi-stage decoder is not significantly increased, in at least some embodiments.

Figure 1:
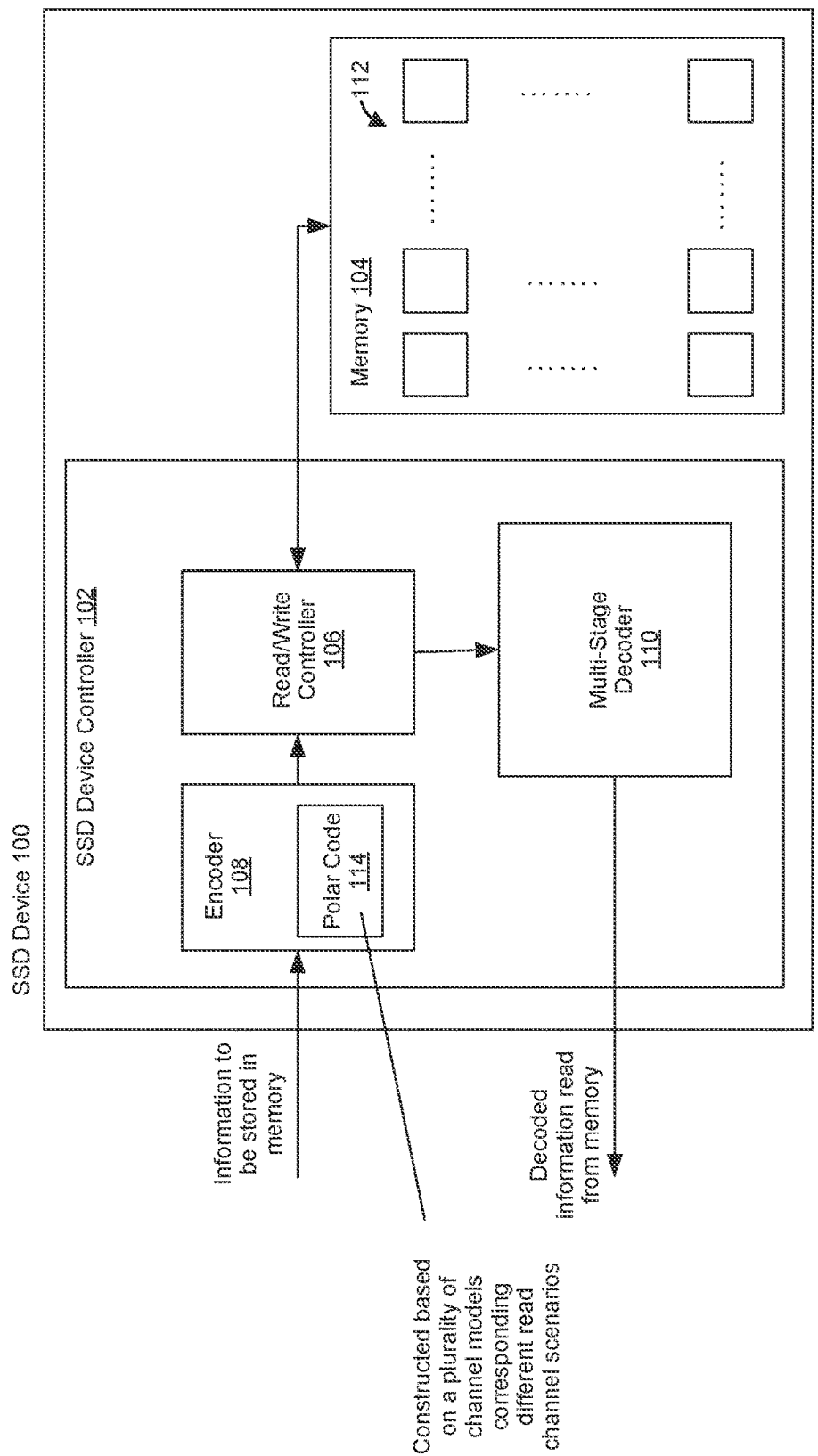
FIG. 1 is a diagram of an example solid state drive (SSD) device configured to encode information, to be stored in a memory, using a polar code that is constructed based on a plurality of channel models corresponding to different read channel scenarios supported by the SSD drive device and/or decode information using a multi-stage decoder, according to an embodiment.

FIG. 1 is a diagram of an example SSD device 100 that includes an SSD device controller 102 communicatively coupled to a memory 104. The memory 104 comprises a non-volatile memory (NVM), in an embodiment. In an embodiment, the memory 104 comprises one or more NAND flash chips. In another embodiment, the memory 104 correspond to another suitable NVM technology other than NAND flash, e.g, phase-change memory (PCM), a ferrorelectric random-access memory (FRAM), a magnetoresistive random-access memory (MRAM), etc. The memory 104 includes a plurality of memory cells 112. In an embodiment, each of the memory cells 112 comprises a floating gate transistor or another type of charge trap transistor. The memory cells 112 include one or more memory cell types, including one or more of single-level cell (SLC) type, multi-level cell (MLC) type, triple-level cell type, quad-bit cell (QLC) type, etc., in an embodiment.

The SSD device controller 102 includes a read/write controller 106, an encoder 108 and a decoder 110. The read/write controller 106 is configured to program the memory cells 112 of the memory 104 with information bits corresponding to messages to be stored in the memory 104, and to subsequently read the information bits to from the memory 104. The read/write controller 106 is configured to program each memory cell 112 to store one or more bit of information. For example, the read/write controller 106 is configured to program an SLC 112 to store a single bit of information, an MLC 112 to store two bits of information, a triple-level cell 112 to store three bits of information, a QLC 112 to store four bits of information, etc., in an embodiment. In other embodiments, the read/write controller 106 is configured to program one or more memory cell 112 to store other suitable numbers of bits (e.g., five, six, seven, eight, etc.) of information.

The read/write controller 106 is configured to read information from the memory 104 by applying reference voltages to the memory cells 112 and determining whether threshold turn-on voltages of the memory cells 112 are below or above the reference voltages applied to the memory cells 112. In an embodiment, the read/write controller 106 supports multiple read channel scenarios that use different numbers of reference voltages to read a memory cell (e.g., an SLC) 112. For example, in a 1-read channel scenario, the read/write controller 106 applies a single reference voltage to a memory cell 112, and determines that a logic one (1) 1 is stored in the memory cell 112 if the reference voltage does not turn on the memory cell 112. Otherwise, if the reference voltage turns on the memory cell 112, the read/write controller 106 determines that a logic zero (0) is stored in the memory cell 112. In a multi-read channel scenario, the read/write controller 106 performs multiple reads with different ones of multiple reference voltages to read a memory cell 112, producing a decision for each of the reference voltages applied to the memory cell 112. The decisions made for the multiple reference voltages applied to the memory cell 112 are then combined using a suitable combination technique, such as a log-likelihood ratio (LLR) technique, and to produce a soft decision on the information stored in the memory cell 112, in an embodiment.

In various embodiments, information stored in the memory 104 is subject to various degradations and variations that, in some cases, lead to errors in the information read from the memory 104. The sources of errors include, for example, process scaling that reduces the amount of charge that can be trapped within a floating gate of a transistor of a memory cell in the memory 104, wear-out in the memory 104, which generally increase with increasing numbers of program/erase cycles performed on the cells of the memory 104, etc. In embodiments, the encoder 108 of the SSD device controller 102 is configured to use an error correction code to encode information prior to the information being stored in the memory 104, to enhance performance of the memory 104. The decoder 110 of the SSD device controller 102 is configured to decode the information when the information is read from the memory 104. The error correction code is constructed such that at least some errors in information read from the memory 104 are correctable when the information is decoded by the decoder 110, in an embodiment.

In an embodiment, the encoder 108 is a polar code encoder configured to use a polar code 114 to encode information prior to the information being stored in the memory 104. The polar code 114 is constructed by a processor (not shown) external to the SSD device 100 and is loaded into the SSD device 100, in an embodiment. Although a single polar code 114 is illustrated in FIG. 1, the encoder 108 is configured to use one of several polar codes 114 to encode information, for example depending on a portion of the memory 104 (e.g., a SLC portion, an MLC portion, etc.) in which the information is to be stored in the memory 104, in some embodiments. Generally, a polar code is constructed based on channel polarization performed on a channel model. To construct a polar code, a pair of identical channels are transformed into two kinds of synthesized polarized channels with different reliabilities, i.e., a "good" channel with a relatively higher reliability and a "bad" channel with a relatively lower reliability. This procedure is sometimes referred to as a channel combining and splitting procedure. When such polarization transformation is recursively applied over the resulting channels, the difference in reliabilities of the polarized channels generally increases. In other words, each channel becomes either i) a "very good" channel or an almost noise free channel or ii) a "very bad" channel or a very noisy channel. Based on such transformation, the "very bad" channels are fixed or frozen (i.e., practically discarded) for example by placing pre-determined fixed values in the "very bad" channels, and the information bits are placed in the remaining or "very good" channels.

The error correction performance of polar codes is generally determined by the summation of the error probabilities of all the information-bearing polarized channels. Accordingly, construction of a polar code of a length N with a code rate of R=K/N generally includes selection of K most reliable channels. In various embodiments, channel reliability for the channels is determined by a recursive calculation algorithm based on Bhattacharyya parameters. The K channels with the smallest Bhattacharyya parameters are then selected as the most reliable channels. Generally, the "very good" channel indices are dependent on the characteristics of a particular physical channel. For example, "very good" indices for a 1-read channel are generally not the same as "very good" indices for a 3-read channel. Accordingly, an optimal polar code for a 1-read channel is generally not the same as an optimal polar code for a 3-read channel.

In embodiments described herein, the polar code 114 used to encode the information by the encoder 108 is constructed based on multiple read channel scenarios, such as a 1-read channel scenario and a 3-read channel scenario. For example, in an embodiment, the polar code 114 is constructed based on a channel model that models an intermediate channel model corresponding to an intermediate channel that is between the multiple read channel scenarios. In another embodiment, the polar code 114 is constructed based on a probabilistic channel model that is created based on probabilities of the information being read using respective ones of the multiple read channel scenarios. In yet another embodiment, the polar code 114 is constructed based on a combination of respective polar codes that are constructed based on respective ones of the multiple read channel scenarios. In various embodiments, because the polar code 114 is constructed based on multiple read channel scenarios, good performance (e.g., a suitably low error rate) is achieved regardless of the particular read channel scenario that the read/write controller 106 uses to read information from the memory 104. For example, in an embodiment in which the polar code 114 is constructed based on multiple read channel scenarios including the 1-read channel scenario and a 3-read channel scenario, good performance (e.g., a suitably low error rate) is achieved whether the information is read from the memory 104 using either the 1-read channel scenario or the 3-read channel scenario.

With continued reference to FIG. 1, in an embodiment, the decoder 110 of the SSD controller device 102 is configured to decode information read from the memory 104 to recover the information bit messages that were encoded and stored in the memory 104. In an embodiment, the decoder 110 is a multi-stage decoder configured to decode the information read from the memory 104 using a plurality of polar code decoding techniques. The decoder 110 is thus sometimes referred to herein as a "multi-stage decoder" 110. For example, the multi-stage decoder 110 is configured to implement two or more of i) belief propagation (BP), ii) modified BP, iii) successive cancellation (SC), and iv) modified SC, in an embodiment. As a more specific example, the multi-stage decoder 110 is configured to implement two or more of i) belief propagation (BP), ii) BP list (BPL), iii) simple BP flip (BPF), iv) complex BPF, v) generalized BPF (GBPF), vi) successive cancellation (SC), vii) SC-list (SCL), and viii) simplified SC. Generally, the multiple decoding techniques vary in complexity, latency, and performance. For example, the SC decoding technique is a serial decoding technique that is relatively high in latency. The SCL decoding technique is a modified version of the SC decoding technique that is generally more powerful in terms of error correction than the SC decoding technique (i.e., is capable of correcting more errors as compared to the SC decoding technique) but is higher in latency than the SC decoding technique. On the other hand, the simplified SC decoding technique is faster but less powerful in terms of correction as compared to the SC decoding technique. The BP decoding technique is a parallelized decoding technique and is thus lower in latency than the SC decoding technique. The BPL and BPF decoding techniques are modified versions of the BP decoding technique that are more powerful and incur greater latency as compared to the BP decoding technique. In other embodiments, the multi-stage decoder 110 is configured to additionally or alternatively use other suitable polar code decoding techniques.

In an embodiment, the multi-stage decoder 110 is configured to successively apply higher latency, but more powerful in terms of error correction, decoding techniques to the information read from the memory 104 until the information is successfully decoded by the multi-stage decoder 110. For example, the multi-stage decoder 110 is configured to begin with a low latency decoding technique (e.g., BP decoding). If the BP decoding technique fails to successfully decode the information, the multi-stage decoder 110 is configured to employ a more powerful but higher latency decoding technique to decode the information, and so on, in an embodiment. Because the more powerful and higher latency decoding techniques are employed only when needed, relatively high average accuracy of the multi-stage decoder 110 may be provided without significantly increasing the average latency incurred in the multi-stage decoder 110, in at least some embodiments.

Figure 2A:
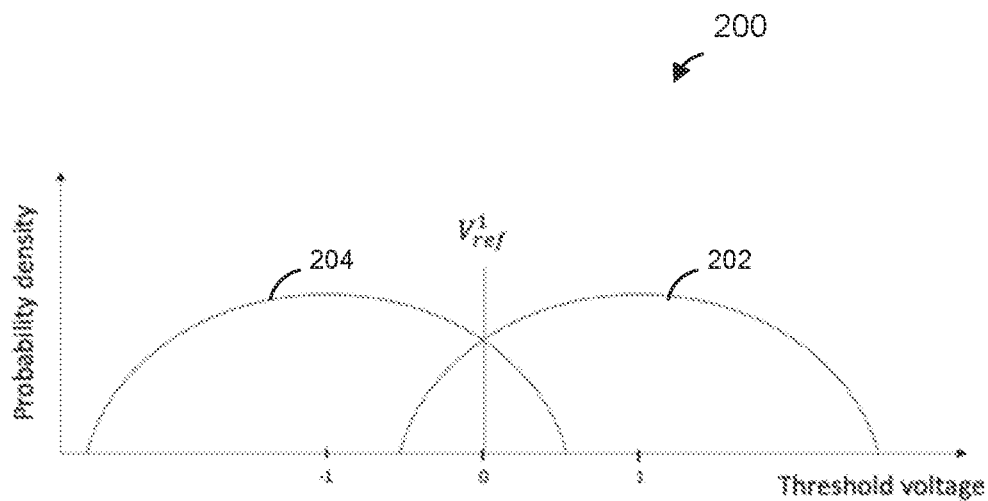
FIG. 2A is a plot illustrating a channel model corresponding to a 1-read channel scenario with a single reference voltage, according to an embodiment.

FIG. 2A is a channel model 200 comprising probability density functions for a threshold voltage of a memory cell for a 1-read channel scenario, according to an embodiment. In the channel model 200, a probability density function 202 corresponds to probability density of the threshold voltage in a memory cell that stores a logic zero, and a probability density function 204 corresponds to probability density of the threshold voltage in a memory cell that stores a logic one. A single ideal reference voltage Vier is placed at the intersection of the probability density functions 202, 204, splitting the possible threshold voltages into two regions. Under this 1-read channel scenario, the threshold voltage being below the reference voltage Vile indicates that a logic one (1) is stored in the memory cell, and the threshold voltage being above the reference voltage $V_{ref}^1$ indicates that a logic zero (0) is stored in the memory cell, in an embodiment.

Figure 2B:
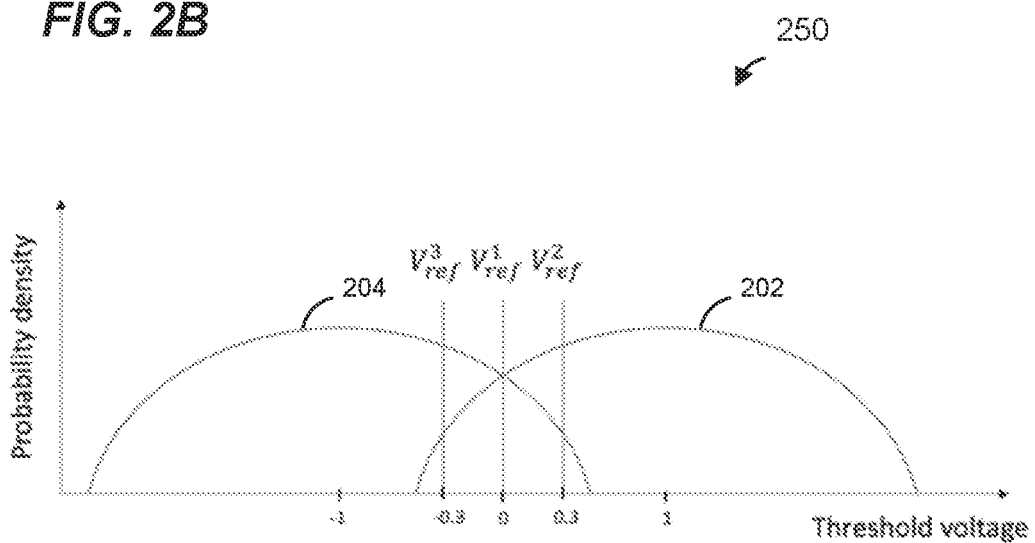
FIG. 2B is a plot illustrating a channel model corresponding to a 3-read channel scenario with three reference voltages, according to an embodiment.

FIG. 2B is a channel model 250 comprising the probability density functions 202, 204 for a threshold voltage of a memory cell of FIG. 2A for a 3-read channel scenario, according to an embodiment. In the channel model 250, three ideal reference voltages $V_{ref}^1$, $V_{ref}^2$, and $V_{ref}^3$ are placed in the region of intersection of the probability density functions 202, 204, splitting the possible threshold voltages into four regions. Under this 3-read channel scenario, the threshold voltage falling in the region below the reference voltage $V_{ref}^3$ indicates with a high confidence that a logic one (1) is stored in the memory cell, the threshold voltage falling in the regions between the reference voltage $V_{ref}^3$ and $V_{ref}^1$ indicates with a low confidence that a logic one (1) is stored in the memory cell, the threshold voltage falling in the region between the reference voltage $V_{ref}^1$ and $V_{ref}^2$ indicates with a low confidence that a logic zero (0) is stored in the memory cell, and the threshold voltage falling in the region above the reference voltage $V_{ref}$ indicates with a high confidence that a logic zero (0) is stored in the memory cell, in an embodiment.

Figure 2C:
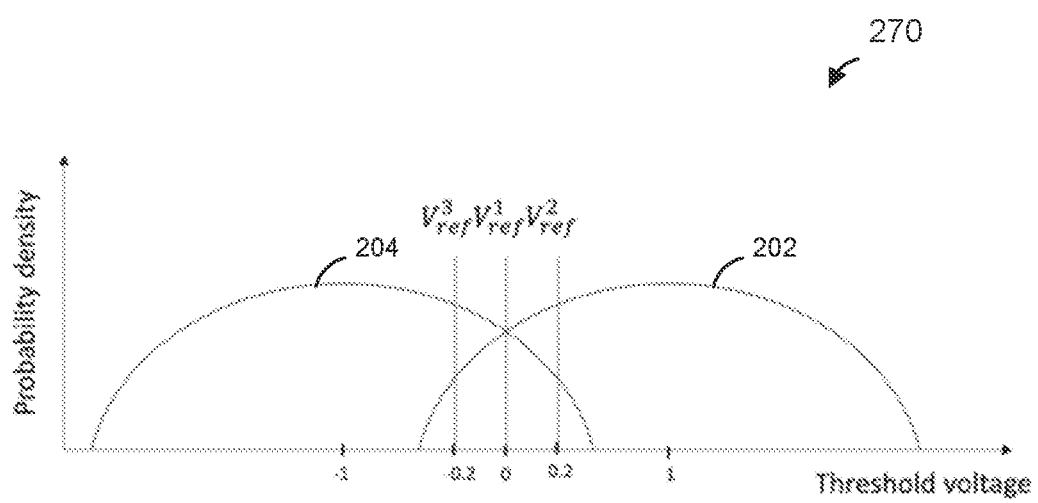
FIG. 2C is a plot illustrating a channel model corresponding to an intermediate channel constructed based on a channel model corresponding to a 1-read channel scenario and a channel model corresponding to a 3-read channel scenario, according to an embodiment.

FIG. 2C is a channel model 270 comprising the probability density functions 202, 204 for a threshold voltage of a memory cell of FIGS. 2A-B with non-ideal reference voltages designed for an intermediate channel for construction of a polar code, according to an embodiment. In an embodiment, the polar code 114 in the SSD device 100 of FIG. 1 is constructed based on the channel model 270 with non-ideal reference voltages as illustrated in FIG. 2C. For ease of explanation, the channel model 270 is described in connection with the SSD device 100 of FIG. 1. However, the channel model 270 is used for constructing polar codes to be used in SSD devices different from the SSD device 100 of FIG. 1, in other embodiments.

In an embodiment, the three reference voltages in the channel model 270 are selected to be between the ideal single reference voltage scenario illustrated in FIG. 2A and the ideal three reference voltage scenario illustrated in FIG. 2B. In particular, in the channel model 270, the reference voltage $V_{ref}^1$, $V_{ref}^2$, and $V_{ref}^3$ are spaced closer together as compared to the reference voltage $V_{ref}^1$, $V_{ref}^2$, and $V_{ref}^3$ in FIG. 2B to create a channel model that is closer to the 1-read channel scenario of FIG. 2A, in an embodiment. Referring to FIGS. 1 and 2A-C, in an embodiment in which the read/write controller 106 supports a 1-read channel scenario and a 3-read channel scenario for reading of information from the memory 104, the read/write controller 106 is configured to read the information from the memory 104 in the 1-read channel scenario using the reference voltage $V_{ref}^1$ as illustrated in FIG. 2A and to read the information from the memory 104 in the 3-read channel scenario using the three reference voltages $V_{ref}^1$, $V_{ref}^2$, and Vier as illustrated in FIG. 2B. On the other hand, in an embodiment, the polar code 114 used to encode the information stored in the memory 104 is constructed based on the channel model 270 that utilizes reference voltages as illustrated in FIG. 2C. Accordingly, the polar code 114 is constructed based on a channel model corresponding to an intermediate channel that is between the 1-read channel scenario of FIG. 2A and a 3-read channel scenario of FIG. 2B. In an embodiment, because the polar code 114 used to encode the information stored in the memory 104 is constructed based on a channel model corresponding to an intermediate channel that is between the 1-read channel scenario of FIG. 2A and a 3-read channel scenario of FIG. 2B, the polar code 114 provides good performance whether the information is read from the memory 104 according to the 1-read channel scenario of FIG. 2A or the 3-read channel scenario of FIG. 2B.

Although the channel model of the plot 270 is generally described in the context of being an intermediate channel model created based on a channel model corresponding to a 1-read channel scenario and a channel model corresponding to a 3-read channel scenario, an intermediate channel model is similarly created based on one or more other read channel scenarios (e.g., 5-read channel scenario, 7-read channel scenario, etc.), in addition to or instead of the 1-read channel scenario and/or the 3-read channel scenario, in other embodiments.

Figure 3:
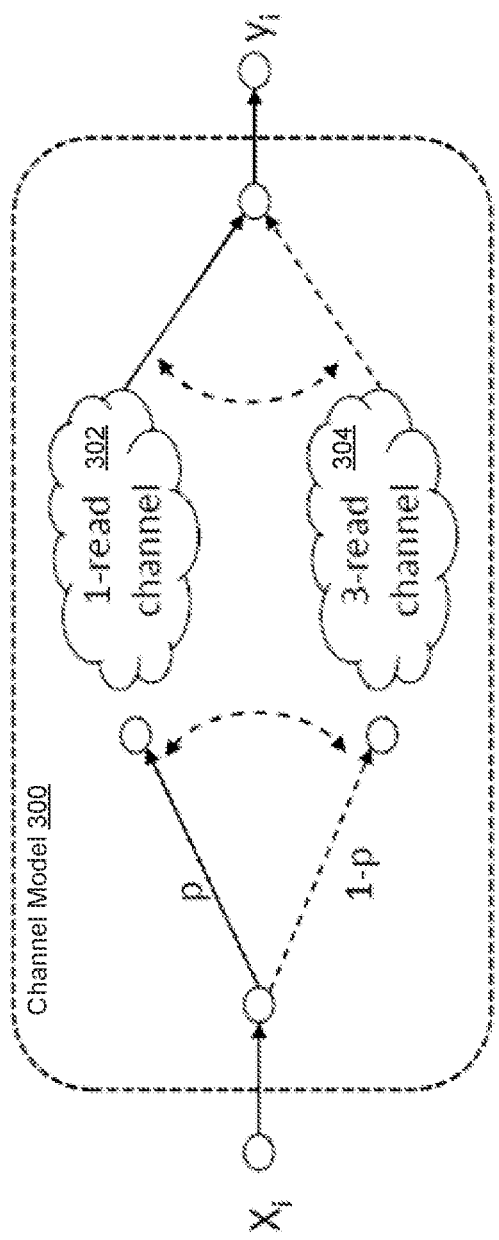
FIG. 3 is a block diagram illustrating a probabilistic channel model that is based on a channel model corresponding to a 1-read channel scenario and a channel model corresponding to a 3-read channel scenario, according to an embodiment.

FIG. 3 is a diagram of a channel model 300 used for constructing a polar code for encoding information to be stored in a memory, according to another embodiment. In an embodiment, the polar code 114 in the SSD device 100 of FIG. 1 is constructed based on the model 300 of FIG. 3. For ease of explanation, the channel model 300 is described in connection with the SSD device 100 of FIG. 1. However, the channel model 300 is used for constructing polar codes to be used in SSD devices different from the SSD device 100 of FIG. 1, in other embodiments.

The channel model 300 is a probabilistic composite channel model created based on multiple channel models corresponding to different read channel scenarios, in an embodiment. For example, the channel model 300 is created based on a weighted combination of respective channel models corresponding to different read channel scenarios. In the embodiment illustrated in FIG. 3, the channel model 300 is created based on a weighted combination of a first channel model 302 corresponding to a 1-read channel scenario and a second channel model 304 corresponding to a 3-read channel scenario. The respective channel models are weighted based on a probability factor p, where p is the probability of the encoded information being read from the memory using the 1-read channel scenario and, accordingly, (1-p) is the probability of the encoded information being read using the 3-read channel scenario. Accordingly, the first channel model 1 302 corresponding to the 1-read channel scenario is given a weight equal to p and the second channel model 304 corresponding to the 3-read channel scenario is given a weight equal to (1-p), according to an embodiment. The value of the probability factor p is used as an optimization parameter for optimizing the channel model 300, in an embodiment. For example, in an embodiment, for a particular SSD device design and/or employment use case in which the 1-read channel scenario is expected to be used more frequently, a higher probability factor p is used as compared to an SSD device design and/or employment use case in which more frequent use of the 3-read channel scenario is expected.

Although the channel model 300 is generally described in the context of being a probabilistic composite channel model created based on a channel model corresponding to a 1-read channel scenario and a channel model corresponding to a 3-read channel scenario, the channel model 300 is a probabilistic composite channel model created based on one or more other read channel scenarios (e.g., 5-read channel scenario, 7-read channel scenario, etc.), in addition to or instead of the 1-read channel scenario and/or the 3-read channel scenario, in other embodiments. For example, in an embodiment, the channel model 300 is created based on a weighted combination of N channel models corresponding to N different read channel scenarios. In this embodiment, the respective channel models are weighted using respective probability factors $p_1, p_2, \ldots, p_N$ of the encoded information being read using the corresponding respective read channel scenarios, where $p_1+p_2+ \ldots +p_N=1$.

Figure 4:
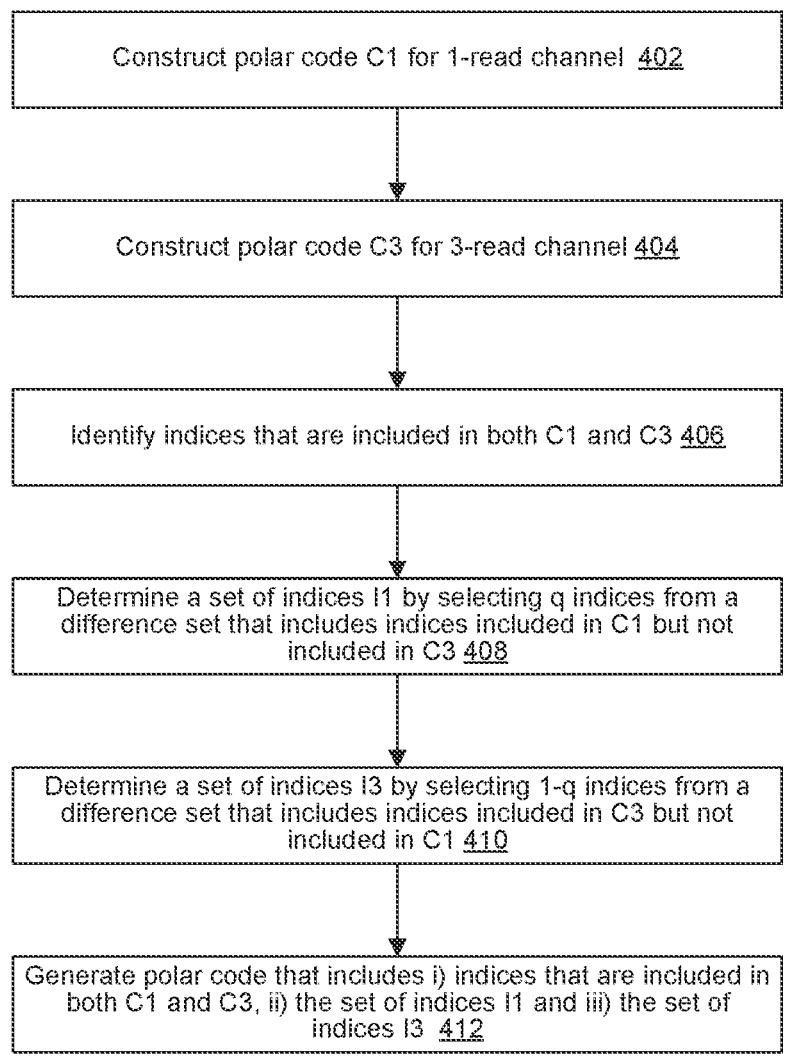
FIG. 4 is a flow chart of an example method for constructing a polar code based on a first polar code constructed based on a channel model corresponding to a 1-read channel scenario and a second polar code constructed based on a channel model corresponding to a 3-read channel scenario, according to an embodiment.

FIG. 4 is a flow chart illustrating a method 400 used for constructing a polar code based on a combination of respective polar codes constructed based on respective channel models corresponding to different ones of multiple read channel scenarios, according to an embodiment. In an embodiment, the polar code 114 in the SSD device 100 of FIG. 1 is constructed based using the method 400 of FIG. 4. For ease of explanation, the process 400 is described in connection with the SSD device 100 of FIG. 1. However, the method 400 is used for constructing polar codes to be used in SSD devices different from the SSD device 100 of FIG. 1, in other embodiments.

At a block 402, a first code C1 is constructed based on a first channel model corresponding to a first read channel scenario, such as a 1-read channel scenario. The first code C1 is constructed with a length N and a code rate R=K/N, and includes indices corresponding to K "good" channels for the first read channel scenario, in an embodiment. The "good" channels for the first read channel scenario are determined using a suitable method for construction of a polar code, in an embodiment. For example, a plurality Bhattacharya parameters are calculated for the N channels, and K channels having the smallest Bhattacharya parameters among the plurality of Bhattacharya parameters are selected as the K "good" channels. In other embodiments, other suitable selection criteria are used to select the K "good" channels.

At a block 404, a second code C3 is constructed based on a second channel model corresponding to a second read channel scenario, such as a 3-read channel scenario. The second code C3 is constructed with a length N a code rate R=K/N, and includes indices corresponding to K "good" channels for the second read channel scenario. The "good" channels for the second read channel scenario are determined using a suitable method for polar code construction, in an embodiment. For example, a plurality Bhattacharya parameters are calculated for the N channels, and K channels having the smallest Bhattacharya parameters among the plurality of Bhattacharya parameters are selected as the K "good" channels. In other embodiments, other suitable selection criteria are used to select the K "good" channels.

At a block 406, a common set of indices is identified. The common set of indices includes indices that are included in both the first code C1 constructed at block 402 and the second code C3 constructed at block 404. In an embodiment, identifying the indices that are included in both the first code C1 constructed at block 402 and the second code C3 constructed at block 404 comprises determining an intersection between the set of indices included in the code C1 and the set of indices included in the set C3.

At block 408, a first difference set that includes indices that are included in the first code C1 but not included in the second code C3 is determined, and a proportion q of the indices that are included in the first code C1 but not included in the second code C3 is selected. In an embodiment, the proportion q of indices for which Bhattacharya parameters are smallest according to polar code construction for the 3-read channel scenario are selected because relatively small Bhattacharya parameters according to polar code construction for the 3-read channel scenario indicate that these indices are acceptable for the 3-read channel scenario. The set of indices selected at block 408 is denoted as a set I1, for example.

At block 410, a second difference set that includes indices that are included in the second code C3 but not included in the first code C1 is determined, and a proportion 1-q of the indices that are included in the second code C3 but not included in the first code C1 is selected. In an embodiment, the proportion (1-q) of indices for which Bhattacharya parameters are smallest according to polar code construction for the 1-read channel scenario are selected because relatively small Bhattacharya parameters according to polar code construction for the 1-read channel scenario indicate that these indices are acceptable for the 1-read channel scenario. The set of indices selected at block 408 is denoted as a set 13, for example.

At block 412, the polar code is determined as a set of indices identified at blocks 408-410. Accordingly, polar code determined at block 412 includes i) the common set of indices that are "good" in both the first code C1 corresponding to the 1-read channel scenario and the second code C3 corresponding to the 3-read channel scenario ii) the set of indices I1 including the proportion q of selected indices that are acceptable for the 3-read channel scenario, and ii) the set of indices I3 including indices that are acceptable for the 1-read channel scenario. Because the set of indices I1 includes the proportion q of selected indices and the set of indices I2 includes a proportion (1-9) of selected indices, the size of the polar code determined at block 412 is the same as the size of each of the first polar code C1 constructed at block 402 and the second polar code C3 constructed at block 404, in an embodiment. In other words, the polar code constructed at block 412 based on the first polar code C1 constructed at block 402 and the second polar code C3 constructed at block 404 includes a same number of "good" channel indices as the number of "good" channel indices in each of the first polar code C1 constructed at block 402 and the second polar code C3, in an embodiment.

In an embodiment, the proportion value q is used as an optimization parameter. For example a relatively higher value of q (e.g., a value close to 1) results in a polar code that is more similar to C1 and is more favorable to the 1-read channel scenario. Accordingly, a relatively higher value of q is used in a case in which the 1-read channel scenario is expected to be used more frequently for reading from the memory, in an embodiment. On the other hand, a relatively lower value of q (e.g., a value close to 0) results in a polar code that is more similar to C3 and is more favorable to the 3-read channel scenario. Accordingly, a relatively lower value of q is used in a case in which the 3-read channel scenario is expected to be used more frequently for reading from the memory, in an embodiment. As another example, in an embodiment, a value of q that is equal to 0.5 is used to equally treat the 1-read channel scenario and the 3-read channel scenario.

It is noted that although the method 400 is generally described herein in the context of two read channel scenarios including a 1-read channel scenario and a 3-read channel scenario, a similar process is used to construct a polar code based on channel models corresponding to one or more other read channel scenarios (e.g., 5-read channel scenario, 7-read channel scenario, etc.) in addition to or instead of the 1-read channel scenario and/or the 3-read channel scenario, in some embodiments. For example, in an embodiment, the process 400 is used to construct a polar code based on N channel models corresponding to N different read channel scenarios. In this embodiment, different proportion values $q_1$, $q_2, \ldots, q_N$, where $q_1+q_2+ \ldots +q_N=1$, of indices that belong to difference sets of indices between codes constructed for the N different read channel scenarios are selected in a manner same or similar to the selection described above with reference to blocks 408, 410. The values $q_1, q_2, \ldots, q_N$ are used to optimize the polar code based on a particular SSD design and/or use case to suitably favor respective ones of the multiple channel scenarios, in an embodiment.

Figure 5:
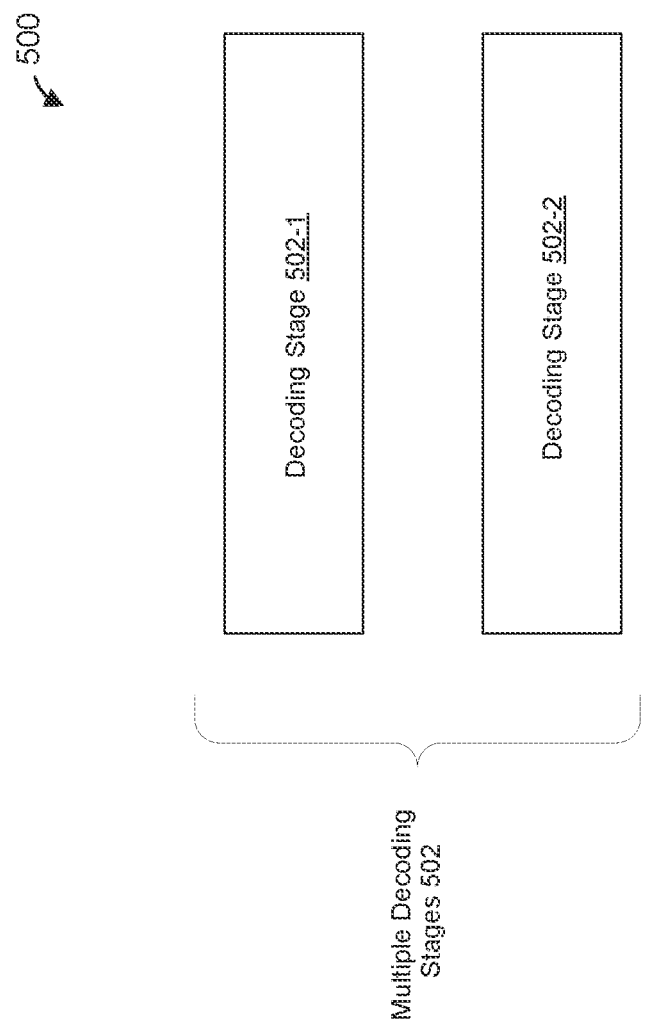
FIG. 5 is a block diagram of a multi-stage decoder, according to an embodiment.

FIG. 5 is a block diagram of a multi-stage decoder 500, according to an embodiment. The multi-stage decoder 500 corresponds to the multi-stage decoder 110 of the SSD device 100 of FIG. 1, in an embodiment. For ease of explanation, the multi-stage decoder 500 is described with reference to the SSD device 100 of FIG. 1. However, the multi-stage decode 500 is used with SSD devices different from the SSD device 100 of FIG. 1, in other embodiments.

The multi-stage decoder 500 includes a plurality of decoder stages 502, including at least a first decoder stage 502-1 and a second decoder stage 502-2. In an embodiment, the decoder stages 502 are configured to implement different decoding techniques to decode information read from a memory (e.g., the memory 104). The different decoding technique implemented by successive decoder stages 502 have increasing decoding powers, in an embodiment. Further, different decoding technique implemented by successive decoder stages 502 incur increasing latencies, in an embodiment. The multi-stage decoder 500 is configured to successively employ respective ones of the multiple stages 502 to decode information read from the memory until the information is successfully decoded or all of the decoder stages have been used. For example, the multi-stage decoder 500 is configured to decode information by the first decoder stage 502-1 using a first decoding technique, and to determine whether the information was successfully decoded using the first decoding technique. In an embodiment, the multi-stage decoder 500 is configured to determine whether information was successfully decoded using the first decoding technique by calculating a cyclic redundancy check (CRC) value of the decoded information and comparing the calculated CRC value to a stored CRC value or to a CRC value embedded into or otherwise included with the encoded information. In response to determining that the information was not successfully decoded using the first decoding technique, the multi-stage decoder 500 is configured to employ the second decoder state 502-2 to decode the information using a second decoding technique that has a higher latency but is more powerful in terms of error correction than the first decoding technique. Thus, the multi-stage decoder 500 is configured to employ a more powerful decoding technique to decode the information only when information cannot be successfully decoded using a less powerful but lower latency decoding technique, in an embodiment. Accordingly, the multi-stage decoder 500 provides more powerful performance without any significant latency to average latency incurred by the multi-stage decoder 500, in at least some embodiments.

In an embodiment, the decoder stages 502 are configured to implement two or more decoding techniques among i) belief propagation (BP), ii) BP list (BPL), iii) simple BP flip (BPF), iv) complex BPF, v) generalized BPF (GBPF), vi) successive cancellation (SC), and vii) SC-list (SCL). As a more specific example, the first decoder stage 502-1 is configured to implement the BP decoding technique and the second decoder stage 502-2 is configured to implement the SC decoding technique. In an embodiment, when implementing the SC decoding technique, the multi-stage decoder 500 performs a series of interlaced step-by-step decisions in which a decision in a particular step depends on one or more decisions made in one or more previous steps. On the other hand, as explained in more detail below, the BP decoding technique is more parallelized that utilizes right-to-left and left-to-right message propagation through a polar code factor graph, in an embodiment. Generally, the BP decoding technique implemented by the first decoder stage 502 is less powerful in terms of correcting errors, but also lower in latency, as compared to the SC decoding technique. Because the multi-stage decoder 500 is configured to employ the second stage 502-2 to decode information using SC decoding only when the first decoder state 502-1 is not able to successfully decode the information using BP decoding, the multi-stage decoder 500 invokes the second decoder stage 502-2 relatively infrequently, in at least some embodiments. For example, in an embodiment, information stored in pages in a memory of an SSD device read using e.g., 1-read channel scenario or 3-read channel scenario, the BP decoding technique is sufficient to successfully decode the information read from a page in the memory of the SSD device due to a relatively low number of errors that need to be corrected.

Although the multi-stage decoder 500 is illustrated in FIG. 5 as including only two decoder stages 502, the multi-stage decoder 500 includes a different number (e.g., 3, 4, 5, 6, etc.) of decoder stages 502, in other embodiments. The multi-stage decoder 500 is configured to successively apply higher latency, but more powerful in terms of error correction, decoding techniques to encoded information until the information is successfully decoded by the multi-stage decoder 500, in an embodiment.

Figure 6:
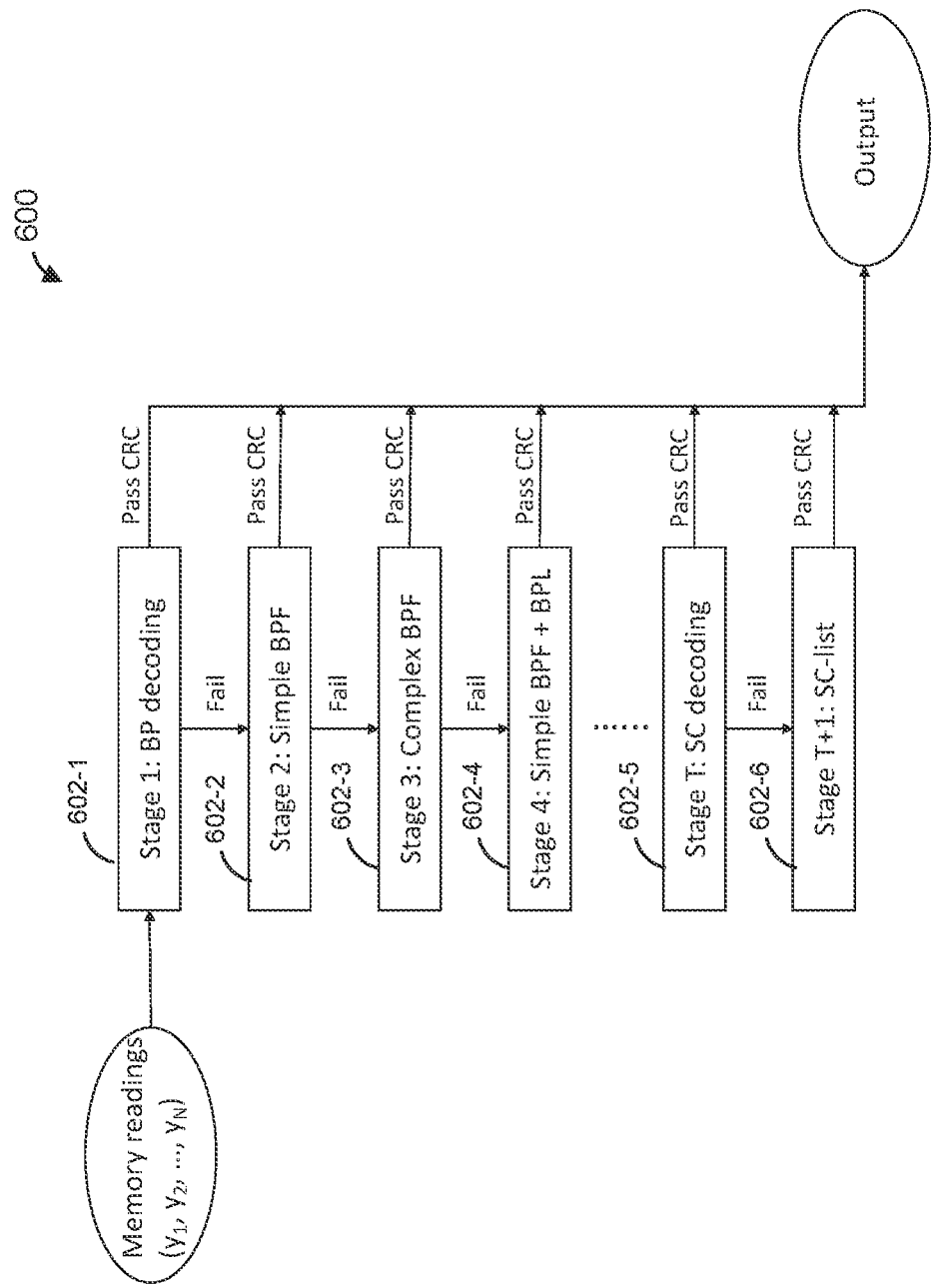
FIG. 6 is a block diagram of a multi-stage decoder, according to another embodiment.

FIG. 6 is a block diagram of an example multi-stage decoder 600 having more than two stages 602, according to an embodiment. The multi-stage decoder 600 corresponds to the multi-stage decoder 110 of the SSD device 100 of FIG. 1, in an embodiment. For ease of explanation, the multi-stage decoder 600 is described with reference to the SSD device 100 of FIG. 1. However, the multi-stage decode 600 is used with SSD devices different from the SSD device 100 of FIG. 1, in other embodiments.

The example multi-stage decoder 600 includes N stages 602 configured to implement progressively higher latency decoding techniques, including a first decoder stage 602-1 configured to implement the BP decoding technique, a second decoder stage 602-2 configured to implement an enhanced BP decoding technique, such as simple BPF decoding, a third decoder stage 602-3 configured to implement a further enhanced BP decoding technique, such as complex BPF decoding, a fourth decoder stage 602-4 configured to implement a combination of simple BPF decoding and BPL decoding, a decoder stage 604-5 configured to implement SC decoding, and a decoder stage 605-6 configured to implement SC-list decoding. In other embodiments, one or more of the decoder stages 602 are omitted from the multi-stage decoder 600 and/or one or more additional decoder stages are included in the multi-stage decoder 600. The multi-stage decoder 600 is configured to successively employ the decoder stages 602, beginning with the first decoder stage 602, as needed to decode information 604 read from a memory and determine whether the information was successfully decoded. In an embodiment, the multi-stage decoder 600 is configured to determine whether information was successfully decoded by calculating a CRC value of the decoded information and comparing the calculated CRC value to a stored CRC value or to a CRC value embedded into or otherwise included with the encoded information. In another embodiment, the multi-stage decoder 600 is configured to determine whether information was successfully decoded using other suitable checking techniques. If the information is successfully decoded by a particular decoder stage 602, then the decoded information is provided as output of the multi-stage decoder 600. On the other hand, if the information is not successfully decoded by a particular decoder stage 602, then a next decoder stage 602 is deployed, in an embodiment.

Figure 7:
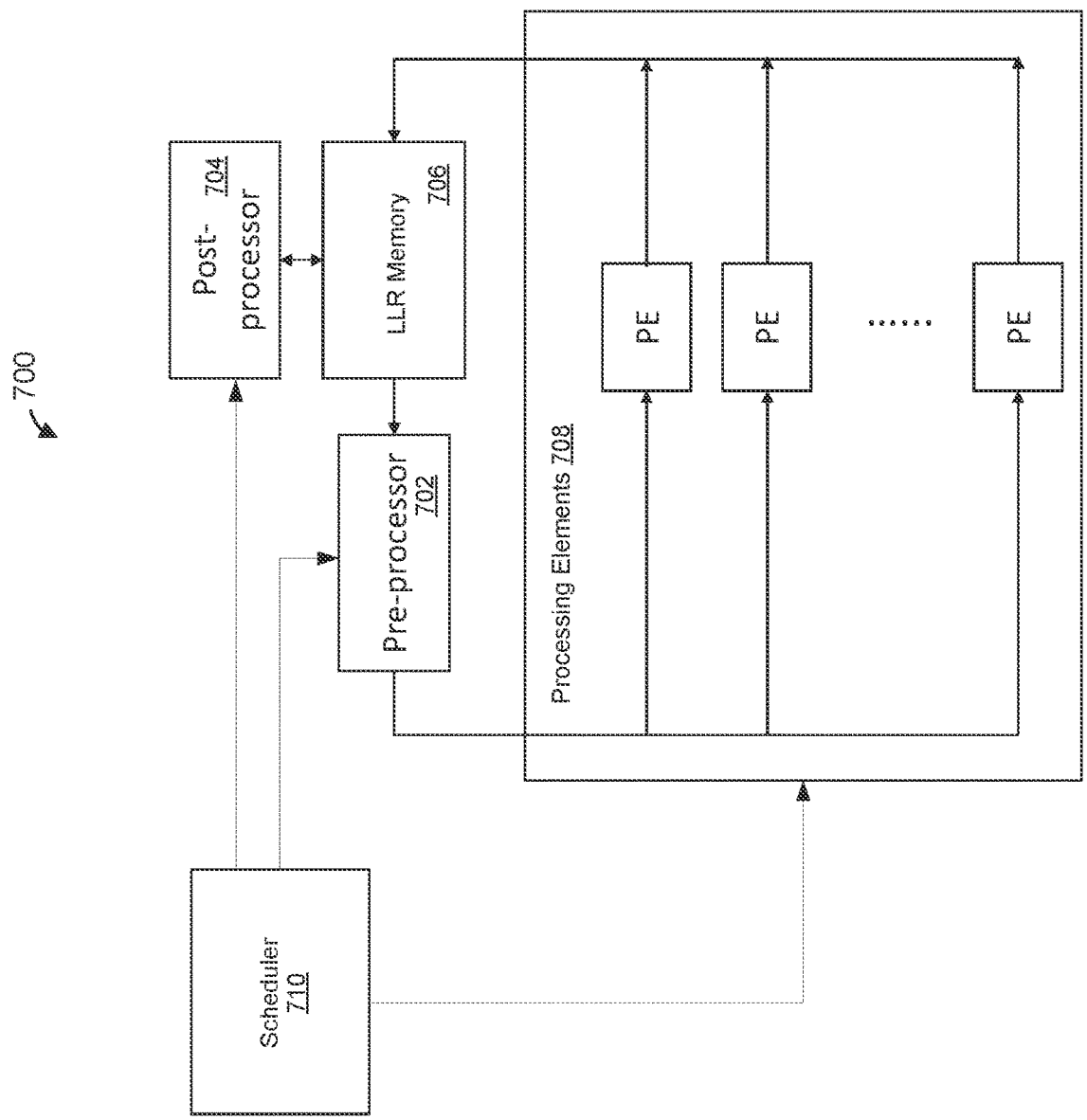
FIG. 7 is a block diagram of an example multi-stage decoder configured to re-use processing elements in different decoding stages, according to an embodiment.

In some embodiments, a multi-stage decoder, such as the multistage decoder 500 described with reference FIG. 5 or the multistage decoder 600 described with reference FIG. 6, is configured such that at least some hardware used for a first decoding technique implemented by a first decoding stage is reused for one or more other decoding techniques implemented by one or more other decoder stages. FIG. 7 is a block diagram illustrating components of a multi-stage decoder 700 configured to reuse processing elements when implementing different ones of multiple decoding techniques in different decoding stages, according to an embodiment. The multi-stage decoder 700 corresponds to the multi-stage decoder 110 of the SSD device 102 of FIG. 1, in an embodiment. For ease of explanation, the multi-stage decoder 700 is described with reference to the SSD device 100 of FIG. 1. However, the multi-stage decode 700 is used with SSD devices different from the SSD device 100 of FIG. 1, in other embodiments. In some embodiments, the multi-stage decoder 700 corresponds to the multi-stage decoder 500 of FIG. 5 or the multi-stage decoder 600 of FIG. 6. In other embodiments, the multi-stage decoder 700 implements decoding stages different from decoding stages of the multi-stage decoder 500 of FIG. 5 or the multi-stage decoder 600 of FIG. 6.

Figure 8:
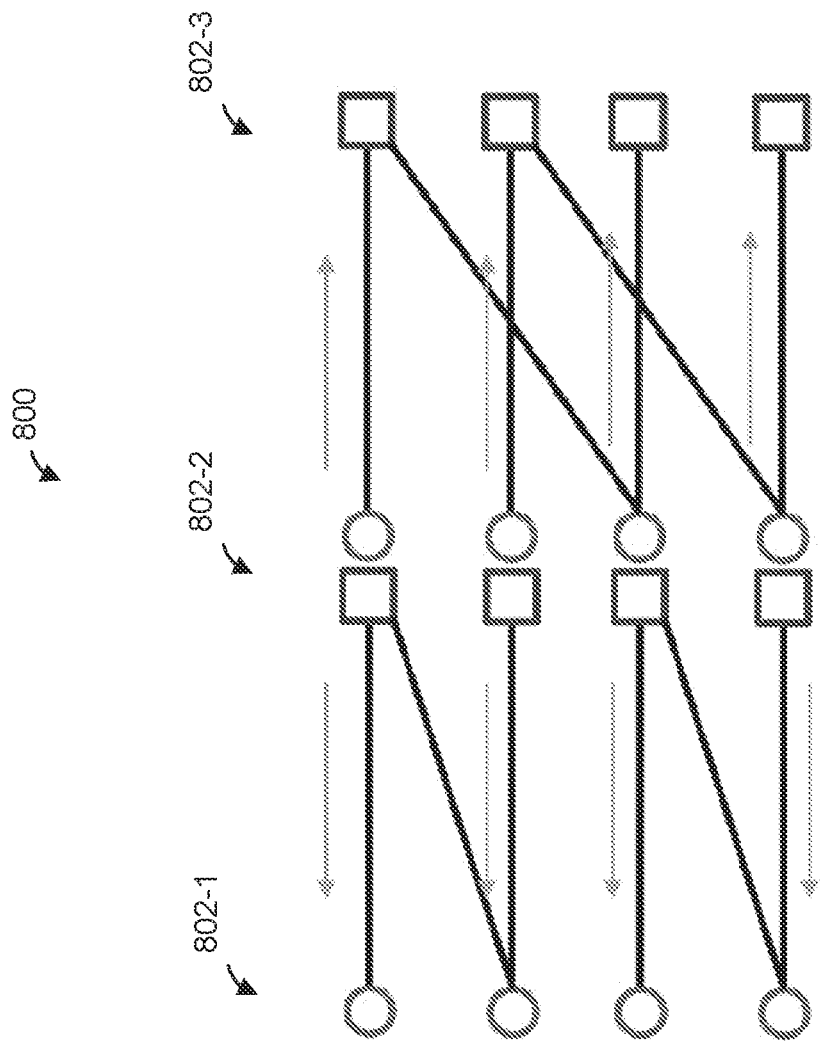
FIG. 8 illustrates an example factor graph that represents a polar code, according to an embodiment.

In embodiments, although specific decoding operations performed by the multi-stage decoder 700 when decoding information using a particular decoder stage (e.g., BP decoder stage, SC decoder stage, etc.) depend on the particular decoding technique implemented by the particular decoder stage, there is certain commonalities between the decoding operations performed for the different decoder stages. Generally, the encoding and decoding are based on a polarization transformation network, which could be described using a factor graph. For a polar code with block length $N=2^n$, the factor graph consists of n+1 stages containing N nodes per stage. Referring briefly to FIG. 8, a factor graph 800 represents a polar code of block length N equal to 4 (i.e., n is equal to 2), and the factor graph 800 includes three stages 802, each having 4 nodes. The various decoding techniques implemented in the decoder stages of the multi-stage decoder 700 involve multiple iterations of right-to-left message update operations and left-to-right message update operations, in an embodiment. Each right-to-left message update operation and left-to-right message update operation calculates a set of one or more values, such as likelihood ratio (LR) values, log likelihood ratio (LLR) values, posterior probability values, etc. based on one or more initial values (e.g., LR values, LLR values, posterior probability values, etc.) and/or one or more values (e.g., LR values, LLR values, posterior probability values, etc.) calculated in a previous iteration, in an embodiment. Although the calculations performed by a multi-stage decoder (e.g., the multi-stage decoder 700 of FIG. 7) in decoding information are generally described herein as being LLR calculations, the calculations are other types of calculations, such as LR calculations, posterior probability, or other suitable decoding calculations, in other embodiments.

Referring again to FIG. 7, in an embodiment, the multi-stage decoder 700 includes a pre-processing engine 702, a post-processing engine 704, an LLR memory 706, a plurality of processing elements 708 and a scheduler 710. The processing elements 708 are configured to perform processing operations, such as LLR calculations for left-to-right and right-to-left message update operations, when implementing iterations of a decoding technique. The LLR memory 706 is configured to store results of the processing operations performed by the processing elements 708 during an iteration of a decoding technique for use of the results in a subsequent iteration of the decoding technique, in an embodiment. In an embodiment, an LLR calculation performed by a processing element 708 during an iteration of a particular decoding technique involves processing one or more input LLR values retrieved from the LLR memory 706 to generate one or more output LLR values. The one or more output LLR values are then stored in the LLR memory 706 for use in a subsequent iteration of the decoding technique.

In an embodiment, the multi-stage decoder 700 is configured to re-use at least some of the processing elements 708 when performing different ones of the multiple decoding techniques. The pre-processing engine 702 is configured to retrieve LLR values from the LLR memory 706 and to provide the LLR values to the processing elements 708 for performing processing operations. In some embodiments and/or scenarios, the pre-processing engine 702 performs one or more processing operations on LLR values retrieved from the LLR memory 706 prior to providing the LLR values to a processing element 708. For example, the pre-processing engine 702 is configured to perform one or more of an addition operation, an exclusive OR operation, a hard decision operation, etc. on LLR values retrieved from the LLR memory 706 prior to providing the LLR values to a processing element 708. The particular operations performed by the pre-processing engine 702 on LLR values retrieved from the LLR memory 706 depends on a particular decoding technique being implemented by the multi-stage decoder 700 and, in some cases, a particular iteration of the particular decoding technique being implemented by the multi-stage decoder 700, in an embodiment.

The post-processing engine 704 is configured to perform post-processing operations on LLR values generated by the processing elements 708. For example, the post-processing engine 704 is configured to perform one or more of an addition operation, an exclusive OR operation, a hard decision operation, etc. on LLR values generated by a processing element 708. The particular operations performed by the post-processing engine 704 on LLR values generated by a processing element 708 depends on a particular decoding technique being implemented by the multi-stage decoder 700 and, in some cases, a particular iteration of the particular decoding technique being implemented by the multi-stage decoder 700, in an embodiment.

The scheduler 710 is configured to control the pre-processing engine 702, the post-processing engine 704 and the processing elements 708 to implement particular ones of the multiple decoding techniques. For example, during implementation of a particular decoding technique, the scheduler 710 is configured to instruct the pre-processing engine 702 to retrieve particular LLR values from the LLR memory 706 (e.g., from particular memory locations in the LLR memory 706) and to provide the LLR values to particular ones of the processing elements 708. In some embodiments or scenarios, the scheduler 710 is configured to instruct the pre-processing engine 702 to perform particular processing operations on the LLR values prior to providing the LLR values to one or more processing elements 708 during implementation of the particular decoding technique. The scheduler 710 is also configured to instruct the post-processing engine 704 to perform particular processing operations on LLR values generated by the one or more processing elements 708 during implementation of the particular decoding technique, in an embodiment.

Figure 9:
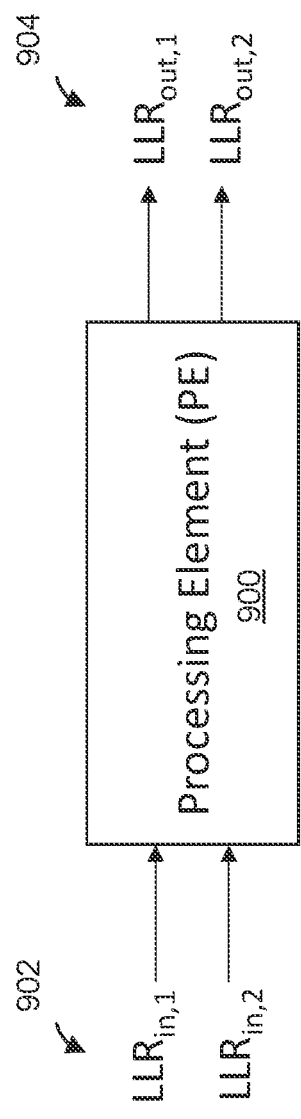
FIG. 9 is a block diagram of an example processing element used for decoding information by a multi-stage decoder, according to an embodiment.

With continued reference to FIG. 7 and also referring to FIG. 9, each processing element 708 of the multi-stage decoder 700 of FIG. 7 is configured as a processing element 900 illustrated in FIG. 9, in an embodiment. The processing element 900 is configured to perform a processing operation on one or more input LLR values 902 to generate one or more output LLR values 904, in an embodiment. In an embodiment, the one or more input values 904 are retrieved from the LLR memory 706 and are provided to the processing element 900. The one or more output LLR values 904 generated by the processing element 900 are stored in the LLR memory 706.

The processing element 900 is used by the multi-stage decoder 700 when decoding information using a first decoding technique, such as BP decoding. For example, the processing element 900 is used by the multi-stage decoder 700 to perform an LLR calculation during one or more iterations of the first decoding technique. The processing element 900 is then re-used by the multi-stage decoder 700 when decoding information using a second decoding technique, such as SC decoding, for example. For example, the processing element 900 is re-used by the multi-stage decoder 700 to perform the LLR calculation during one or more iterations of the second decoding technique.

The processing element 900 is configured to perform a right-to-left message update operation or left-to-right message update operation, in an embodiment. In an embodiment, the one or more input LLR values 902 provided to the processing element 900 for performing the LLR calculation during an iteration of the first decoding technique are not the same as the one or more input LLR values 902 provided to the processing element 900 for performing the LLR calculation during an iteration of the second decoding technique. For example, the one or more input LLR values 902 provided to the processing element 900 for performing the LLR calculation during an iteration of the first decoding technique are retrieved from a different memory location in the LLR memory 706 than the one or more input LLR values 902 provided to the processing element 900 for performing the LLR calculation during an iteration of the second decoding technique. Additionally or alternatively, pre-processing of the one or more LLR values 902 performed by the pre-processing engine 702 during an iteration of the first decoding technique is different from pre-processing of the one or more LLR values 902 performed by the pre-processing engine 702 during an iteration of the second decoding technique. Similarly, in an embodiment, the one or more LLR values 904 generated by the processing element 900 during an iteration of the first decoding technique are stored in a different memory location in the LLR memory 706 than the one or more LLR values 904 generated by the processing element 900 during an iteration of the second decoding technique. Additionally or alternatively, post-processing of the one or more output LLR values 904 performed by the post-processing engine 704 during an iteration of the first decoding technique is different from post-processing of the one or more output LLR values 904 performed by the post-processing engine 704 during an iteration of the second decoding technique. The scheduler 110 is configured to provide instructions to the pre-processing engine 702 and the post-processing engine 704 on the particular processing operations to be performed by the pre-processing engine 702 and the post-processing engine 704 when implementing particular decoding techniques, in an embodiment. As just an example, in the left-to-right message updates of the SC decoding technique, the scheduler 710 instructs the post-processing engine 704 to make a hard decision based on one or more LLR values generated by the processing element 900, in an embodiment. The scheduler 710 further instructs the post-processing engine 704 to store the hard decision in a particular memory location the LLR memory 706, in an embodiment.

In various embodiments, the pre-processing operations performed by the pre-processing engine 702, the post-processing operations performed by the post-processing engine 704, and scheduling and instructions provided by the scheduler 710 enable reuse of the processing elements 708 for different decoding techniques performed by the multi-stage decoder 700.

Figure 10:
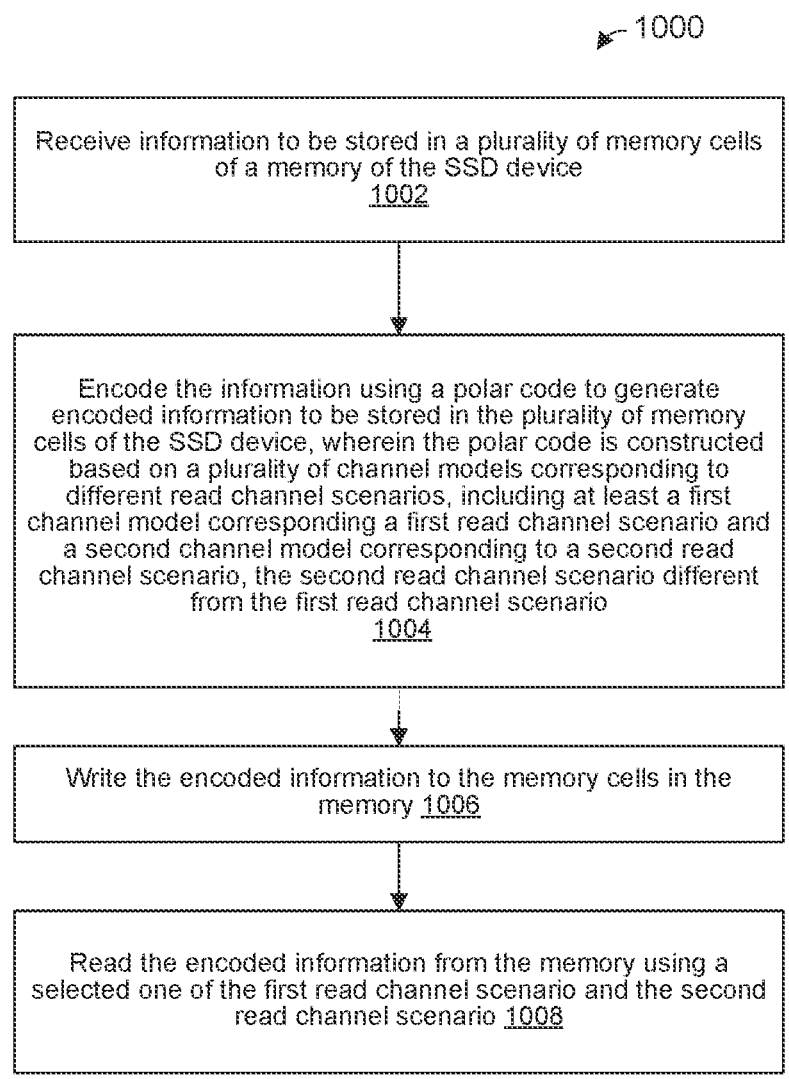
FIG. 10 is a flow diagram of an example method for encoding information using a polar code in an SSD device, according to an embodiment.

FIG. 10 is a flow diagram of an example method 1000 performed in an SSD device, according to an embodiment. In one embodiment, the method 1000 is implemented in the SSD device 100 of FIG. 1, and the method 1000 of FIG. 10 is described with reference to FIG. 1 merely for explanatory purposes. In other embodiments, the method 1000 is implemented in another suitable SSD device.

At a block 1002, information to be stored in a plurality of memory cells of a memory of the SSD device is received. For example, the encoder 108 receives information to be stored in memory cells 112 of the memory 104. The information includes a plurality of bit values to be stored in the memory cells 112 of the memory 104, for example.

At a block 1004, the information received at block 1002 is encoded to generate encoded information for storage in the memory. For example, the encoder 108 encodes the information for storage in the memory cells 112 of the memory 104. In an embodiment, the encoder encodes the information using a polar code. For example, the encoder encodes the information using the polar code 114. In an embodiment, the polar code is constructed based on a plurality of channel models corresponding to different read channel scenarios, including at least a first channel model corresponding a first read channel scenario and a second channel model corresponding to a second read channel scenario. In an embodiment, the second read channel scenario is different from the first read channel scenario. For example, the first read channel scenario comprises 1-read channel scenario and the second read channel scenario comprises a multi-read channel scenario such as a 3-read channel scenario or a many-read (e.g., 5-read, 7-read, etc.) channel scenario. As another example, the first read channel scenario and the second read channel scenario are different multi-read channel scenarios. For example, the first read channel scenario is a 3-read channel scenario and the second read channel scenario is a 5-read channel scenario.

In an embodiment, as described, for example, with reference to FIGS. 2A-C, the polar code is constructed based on a channel model corresponding to an intermediate channel that uses one or more read reference voltages that are between one or more read reference voltages ideal for the first read channel scenario and one or more read reference voltages ideal for the second read channel scenario. In another embodiment, as described, for example, with reference to FIG. 3, the polar code is constructed based on a channel model created based on distribution of probabilities p indicating respective probabilities that the information is read from the memory using the first read channel scenario and the second read channel scenario, wherein the probabilities p add up to 1. In still another embodiment, as descried, for example, in connection with FIG. 4, the polar code is constructed based on i) a first polar code constructed based on the first channel model corresponding the first read channel scenario, the first set of indices including a first set of indices onto which information bits are to be encoded in the first read channel scenario on the and ii) a second polar code constructed based on the second channel model corresponding the second read channel scenario, the second set of indices including a second set of indices of channels onto which information bits are to be encoded in the second read channel scenario. In other embodiments, the polar code is constructed based on a plurality of channel models corresponding to different read channel scenarios in other suitable manners.

At a block 1006, the encoded information is written to the memory cells of the memory. For example, the read/write controller 106 writes the encoded information to the memory cells 112 of the memory 104.

At block 1006, the encoded information is read from the memory using a selected one of the first read channel scenario and the second read channel scenario. For example, the read/write controller 106 reads the encoded information from the memory 104 using a selected one of the first read channel scenario and the second read channel scenario. In embodiments, because the information was encoded using a polar code constructed based on multiple read channel scenarios, including the first read channel scenario and the second read channel scenario, good performance (e.g., a suitably low error rate) is achieved regardless of the particular read channel scenario used to read information from the memory. For example, in an embodiment in which the polar code is constructed based on multiple read channel scenarios including the 1-read channel scenario and the 3-read channel scenario, good performance (e.g., a suitably low error rate) is achieved whether the information is read out using either the 1-read channel scenario or the 3-read channel scenario, in an embodiment.

Figure 11:
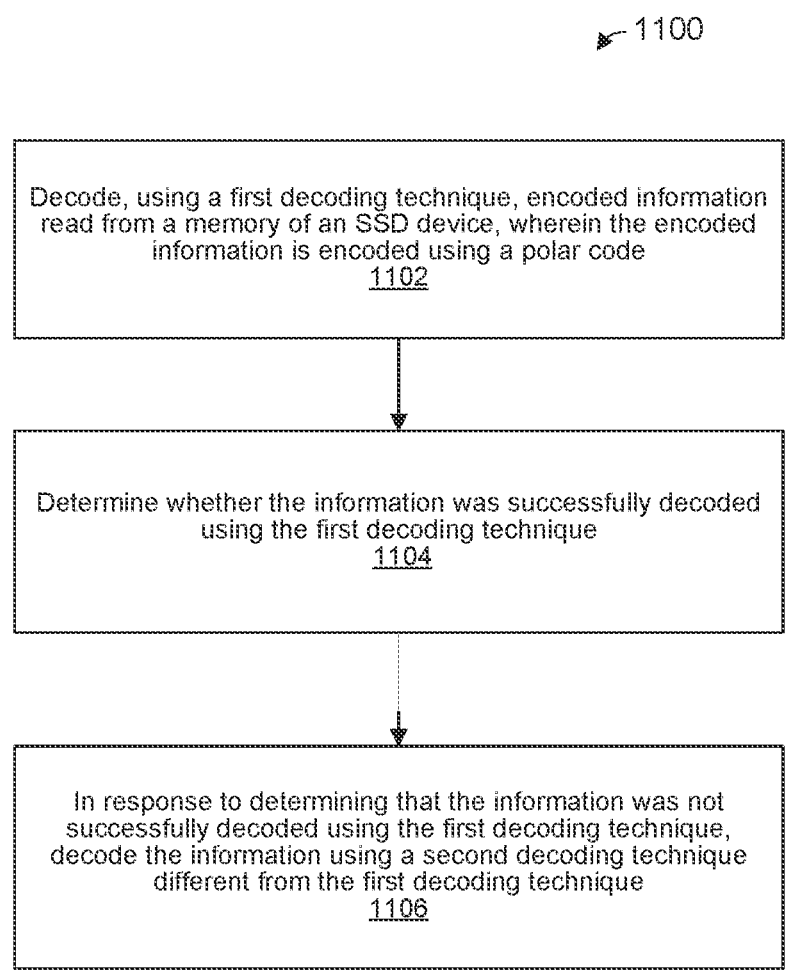
FIG. 11 is a flow diagram of an example method for decoding information that was encoded using a polar code in an SSD device, according to an embodiment.

FIG. 11 is a flow diagram of an example method 1100 performed in an SSD device, according to an embodiment. In one embodiment, the method 1100 is implemented in the SSD device 100 of FIG. 1, and the method 1100 of FIG. 11 is described with reference to FIG. 1 merely for explanatory purposes. In other embodiments, the method 1100 is implemented in another suitable SSD device. In some embodiments, the method 1100 is implemented by one of the multi-stage decoder 500 of FIG. 5, the multi-stage decoder 600 of FIG. 6 or the multi-stage decoder 700 of FIG. 7.

At a block 1102, encoded information read from the memory of the SSD device is decoded using a first decoding technique. In an embodiment, the multi-stage decoder 110 decodes the information using the first decoding technique. In an embodiment, the encoded information is encoded using a polar code, and the encoded information is decoded using a first decoding technique for decoding polar codes. In an embodiment, the first decoding technique is a BP decoding technique. In another embodiment, the first decoding technique is a suitable decoding technique different from BP decoding.

At a block 1104, it is determined whether the information was successfully decoded using the first decoding technique. For example, the multi-stage decoder 110 determines whether the information was successfully decoded using the first decoding technique. In an embodiment, determining whether the information was successfully decoded using the first decoded technique includes calculating a CRC value based on the information decoded using the first decoded technique, comparing the CRC value to a CRC value stored in a memory or included with the encoded information, and determining that the information was successfully decoded if the calculated CRC value matches the CRC value stored in the memory or included with the encoded information.

At block 1106, the encoded information is decoded using a second decoding technique different from the first decoding technique. In an embodiment, the multi-stage decoder 110 decodes the information using the second decoding technique. In an embodiment, block 1106 is performed in response to determining at block 1104 that the information was not successfully decoded using the first decoding technique. In an embodiment, the second decoding technique is an SC decoding technique. In another embodiment, the second decoding technique is a suitable decoding technique different from SC decoding. The second decoding technique is higher in latency but more power in error correction as compared to the first decoding technique. Because the more powerful higher latency decoding technique is employed only if information is not successfully decoded using a lower latency technique, average latency of the multi-stage decoder is not significantly increased as compared on a decoder that is configured to use only the first decoding technique, in at least some embodiments.

In some embodiment, the method 1100 includes, when decoding the information using the second decoding technique, re-using processing elements used for decoding the information using the first decoding technique. In some embodiments, the method further includes determining whether the information was successfully decoded using the second decoding technique and, in response to determining that the information was not successfully decoded using the second decoding technique, successively using one or more further decoding techniques with progressively higher latencies until the information is successfully decoded.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A solid state drive (SSD) device, comprising:
a memory comprising a plurality of memory cells;
an encoder configured to encode information using a polar code to generate encoded information to be stored in the memory, wherein the polar code is constructed based on a plurality of channel models corresponding to different read channel scenarios, including at least a first channel model corresponding a first read channel scenario and a second channel model corresponding to a second read channel scenario, the second read channel scenario different from the first read channel scenario, and wherein the polar code is constructed further based on a probabilistic channel model generated based on distribution of probabilities p indicating respective probabilities that the encoded information is read from the memory using the first read channel scenario and the second read channel scenario; and
a controller configured to:
write the encoded information to memory cells in the memory, and
read the encoded information from the memory cells in the memory using a selected one of the first read channel scenario and the second read channel scenario.

2. A solid state drive (SSD) device comprising:
a memory comprising a plurality of memory cells;
an encoder configured to encode information using a polar code to generate encoded information to be stored in the memory, wherein the polar code is constructed based on a plurality of channel models corresponding to different read channel scenarios including at least a first channel model corresponding a first read channel scenario and a second channel model corresponding second read channel scenario, the second read channel scenario different from the first read channel scenario, and wherein the polar code is constructed further based on i) a first polar code constructed based on the first channel model corresponding the first read channel scenario, the first polar code including a first set of indices onto which information bits are to be encoded and ii) a second polar code constructed based on the second channel model corresponding the second read channel scenario, the second polar code including a second set of indices of channels onto with which information bits are to be encoded, and
a controller configured to:
write the encoded information to memory cells in the memory, and
read the encoded information from the memory cells in the memory using a selected one of the first read channel scenario and the second read channel scenario.

3. The SSD device of claim 2, wherein the polar code is constructed to include i) a common set of indices, the common set of indices including indices that are included in both the first set of indices of the first polar code and the second set of indices of the second polar code, ii) a proportion q of indices selected from a first difference set of indices, the first difference set of indices including indices that are included in the first set of indices of the first polar code and not included in the second set if indices of the second polar code ii) a proportion (1-q) of indices selected from a second difference set of indices, the second difference set including indices that are included in the second set of indices of the second polar code and not included in the first set of indices of the first polar code, wherein q is a number less than or equal to 1.

4. The SSD device of claim 3, wherein i) the proportion q of indices includes indices that are selected, from the first difference set of indices, based on Bhattacharya parameters calculated for corresponding indices for the second read channel scenario and ii) the proportion (1-q) of indices includes indices that are selected, from the second difference set, based on Bhattacharya parameters calculated for corresponding indices for the first read channel scenario.

5. The SSD device of claim 2, wherein:
the first read channel scenario comprises the encoded information being read from the memory using a first number of reference voltage levels, and
the second read channel scenario comprises the encoded information being read from the memory using a second number of reference voltage levels different from the first number of reference voltage levels.

6. The SSD device of claim 2, further comprising a multi-stage decoder configured to:
decode the encoded information read from the memory using a first decoding technique,
determine whether the information was successfully decoded using the first decoding technique, and
in response to determining that the information was not successfully decoded using the first decoding technique, decode the information using a second decoding technique different from the first decoding technique.

7. The SSD device of claim 1, wherein:
the first read channel scenario comprises the encoded information being read from the memory using a first number of reference voltage levels, and the second read channel scenario comprises the encoded information being read from the memory using a second number of reference voltage levels different from the first number of reference voltage levels.

8. The SSD device of claim 7, wherein:
the first read channel scenario comprises the encoded information being read from the memory using a single reference voltage level, and
the second read channel scenario comprises the encoded information being read from the memory using three reference voltage levels.

9. The SSD device of claim 1, further comprising a multi-stage decoder configured to:
decode the encoded information read from the memory using a first decoding technique,
determine whether the information was successfully decoded using the first decoding technique, and
in response to determining that the information was not successfully decoded using the first decoding technique, decode the information using a second decoding technique different from the first decoding technique.

10. The SSD device of claim 1, wherein the memory comprises a NAND flash memory.

11. A method for encoding information for storage in a solid state device (SSD), the method comprising:
receiving, at an encoder of the SSD device, the information to be stored in a plurality of memory cells of a memory of the SSD device;
encoding, by the encoder, the information using a polar code to generate encoded information to be stored in the plurality of memory cells of the SSD device, wherein the polar code is constructed based on a plurality of channel models corresponding to different read channel scenarios, including at least a first channel model corresponding a first read channel scenario and a second channel model corresponding to a second read channel scenario, the second read channel scenario different from the first read channel scenario, and wherein the polar code is constructed further based on a probabilistic channel model generated based on distribution of probabilities p indicating respective probabilities that the information is read from the memory using the first read channel scenario and the second read channel scenario;
writing, by a controller of the SSD device, the encoded information to memory cells in the memory; and
reading, by the controller of the SSD device, the encoded information from the memory using a selected one of the first read channel scenario and the second read channel scenario.

12. A method for encoding information for storage in a solid state device (SSD), the method comprising:
receiving, at an encoder of the SSD device, the information to be stored in a plurality of memory cells of a memory of the SSD device;
encoding, by the encoder, the information using a polar code to generate encoded information to be stored in the plurality of memory cells of the SSD device, wherein the polar code is constructed based on a plurality of channel models corresponding to different read channel scenarios, including at least a first channel model corresponding a first read channel scenario and a second channel model corresponding to a second read channel scenario, the second read channel scenario different from the first read channel scenario, and wherein the polar code is constructed further based on i) a first polar code constructed based on the first channel model corresponding the first read channel scenario, the first polar code including a first set of indices onto which information bits are to be encoded and ii) a second polar code constructed based on the second channel model corresponding the second read channel scenario, the second polar code including a second set of indices of channels onto with which information bits are to be encoded;
writing by a controller of the SSD device the encoded information to memory cells in the memory, and
reading, by the controller of the SSD device, the encoded information from the memory using a selected one of the first read channel scenario and the second read channel scenario.

13. The method of claim 12, wherein the polar code is constructed to include i) a common set of indices, the common set of indices including indices that are included in both the first set of indices of the first polar code and the second set of indices of the second polar code, ii) a proportion q of indices selected from a first difference set of indices, the first difference set of indices including indices that are included in the first set of indices of the first polar code and not included in the second set if indices of the second polar code ii) a proportion (1-q) of indices selected from a second difference set of indices, the second difference set including indices that are included in the second set of indices of the second polar code and not included in the first set of indices of the first polar code, wherein q is a number less than or equal to 1.

14. The method of claim 13, wherein i) the proportion q of indices includes indices that are selected, from the first difference set of indices, based on Bhattacharya parameters calculated for corresponding indices for the second read channel scenario and ii) the proportion (1-q) of indices includes indices that are selected, from the second difference set, based on Bhattacharya parameters calculated for corresponding indices for the first read channel scenario.

15. The method of claim 12, wherein:
the first read channel scenario comprises the encoded information being read from the memory using a first number of reference voltage levels, and
the second read channel scenario comprises the encoded information being read from the memory using a second number of reference voltage levels different from the first number of reference voltage levels.

16. The method of claim 12, further comprising:
decoding, by a multi-stage decoder of the SSD device, the encoded information read from the memory using a first decoding technique,
determining, by the multi-stage decoder, whether the information was successfully decoded using the first decoding technique, and
in response to determining that the information was not successfully decoded using the first decoding technique, decoding, by the multi-stage decoder, the information using a second decoding technique different from the first decoding technique.

17. The method of claim 11, wherein:
the first read channel scenario comprises the encoded information being read from the memory using a first number of reference voltage levels, and
the second read channel scenario comprises the encoded information being read from the memory using a second number of reference voltage levels different from the first number of reference voltage levels.

18. The method of claim 17, wherein:
the first read channel scenario comprises the encoded information being read from the memory using a single reference voltage level, and
the second read channel scenario comprises the encoded information being read from the memory using three reference voltage levels.

19. The method of claim 11, further comprising:
decoding, by a multi-stage decoder of the SSD device, the encoded information read from the memory using a first decoding technique,
determining, by the multi-stage decoder, whether the information was successfully decoded using the first decoding technique, and
in response to determining that the information was not successfully decoded using the first decoding technique, decoding, by the multi-stage decoder, the information using a second decoding technique different from the first decoding technique.

20. The method of claim 11, wherein the memory comprises a NAND flash memory.

* * * * *